United States Patent
Martin et al.

[15] 3,682,934
[45] Aug. 8, 1972

[54] CERTAIN 3-(2-LOWER-ALKOXY-5-PYRIDYL)-UREAS

[72] Inventors: Henry Martin, Gellerstrasse 24, Basel, Switzerland; Georg Pissiotas, Breslauerstrasse 8, Loerrach, Germany

[22] Filed: April 10, 1970

[21] Appl. No.: 27,455

[30] Foreign Application Priority Data

April 18, 1969 Switzerland..............5899/69

[52] U.S. Cl....260/295.5 D, 260/294.8 G, 260/294.9, 71/94, 424/266
[51] Int. Cl...............................................C07d 31/40
[58] Field of Search...................260/295 E, 295.5 D

[56] References Cited

UNITED STATES PATENTS 3,404,152  10/1968  Thiele et al................260/295
3,376,309  4/1968  Foster et al................260/295

*Primary Examiner*—Alan L. Rotman
*Attorney*—Harry Goldsmith, Joseph G. Kolodny and Mario A. Monaco

[57] ABSTRACT

Pyridylureas of the general formula

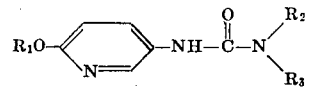

in which $R_1$, $R_2$ and $R_3$ have the meanings given below, their manufacture and pesticidal preparations containing them are disclosed.

4 Claims, No Drawings

CERTAIN 3-(2-LOWER-ALKOXY-5-PYRIDYL)-UREAS

The present invention relates to pyridylureas, their manufacture and pesticidal preparations containing them.

The present invention provides compounds of the general formula

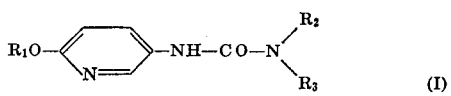

(I)

in which $R_1$ represents a $C_1$–$C_4$ alkyl, $C_2$–$C_4$ alkenyl, $C_2$–$C_4$ alkinyl, $C_1$–$C_4$ halogenalkyl or $C_2$–$C_4$ halogenalkenyl radical or a $C_1$–$C_4$ alkyl radical interrupted once or several times by O and/or S, $R_2$ represents a hydrogen atom or a $C_1$–$C_4$ alkyl, $C_2$–$C_4$ alkenyl or $C_2$–$C_4$ alkinyl radical or a phenyl radical optionally substituted by one or more, identical or different, halogen atoms, $C_1$–$C_4$ alkyl, $C_1$–$C_4$ alkoxy, $-CF_3$, $-NO_2$ or $-CN$ groups and $R_3$ represents a $C_1$–$C_4$ alkyl or $C_1$–$C_4$ alkoxy radical.

The alkyl, alkenyl and alkinyl chains which are possible for $R_1$ to $R_3$ can be branched or straight-chain. As alkyl; alkenyl and alkinyl radicals, there may be mentioned, for example, methyl, ethyl, propyl, isopropyl, n-, i-, sec.- or tert.-butyl, allyl, methallyl, methylpropenyl, propinyl or iso-butinyl.

Especially important compounds are those of formula

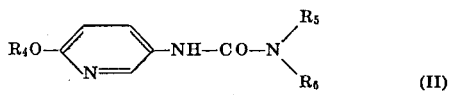

(II)

wherein $R_4$ represents a $C_1$–$C_4$ alkyl radical, $R_5$ represents a hydrogen atom or a methyl group and $R_6$ represents a methyl or methoxy group.

The present invention provides a process for the manufacture of the pyridylureas of formula (I) by a method known per se, which for example comprises:

a. reacting a compound of formula

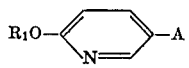

with a primary or secondary amine of formulas

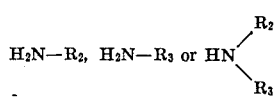

which can together form the urea grouping, in which formulas $R_1$ to $R_3$ have the meanings given above for formula (I), and A represents the grouping

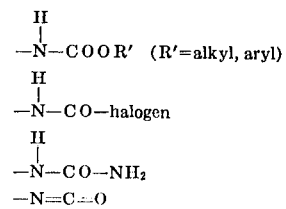

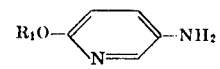

b. reacting a compound of formula

with a compound of the formulas

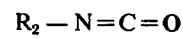

in which $R_1$ to $R_3$ have the meanings given above for formula (I).

The compounds of formula (I) show a broad biocidal action can be employed for combating very diverse vegetable and animal pests.

The compounds especially possess a herbicidal action. This action can be total or selective. A total herbicidal and also defoliating action is observed if larger amounts are used. Such actions are always of advantage in cases where the soil being cultured is to be prepared for a new planting whilst remnants of previously planted cultures are still present. The selective herbicidal action can be achieved both in the pre-emergence and in the post-emergence process and is particularly observed in important large-scale cultures, for example, grain, for example, wheat, oats, barley, rice and maize, sugar beet, soya, cotton, lucerne, potatoes and others. The amounts used can vary within wide limits, for example, within the range of from 0.1 to 10 kg of active substance per hectare, but preferably 0.5 to 5 kg per hectare.

The compounds of formula (I) are of especial economic importance for the selective combating of weeds in upland and paddy rice cultures.

The active substances according to the invention can be employed by themselves or in agents, together with a suitable carrier and/or other additives.

Thus, the present invention also provides pesticidal preparations which comprise, as active ingredient, a compound of the general formula (I), together with a carrier and/or other additive.

Suitable carriers and additives can be solid or liquid and correspond to the substances which are customary in formulation technology, for example, natural or regenerated mineral substances, solvents, diluents, dispersing agents, emulsifiers, wetting agents, adhesives, thickeners, binders or fertilizers. Furthermore, other biocidal compounds can be added. Such biocidal compounds can, for example, belong to the class of the ureas, the saturated or unsaturated halogen-fatty acids, halogenobenzonitriles, halogenobenzoic acids, phenoxyalkylcarboxylic acids, carbamates, triazines, nitroalkylphenols, organic phosphoric acid compounds, quaternary ammonium salts, sulphamic acids, arsenates, arsenites, borates and chlorates. When manufacturing herbicidally active agents it is, for example, possible to use the following components for combination purposes:

A. Substituted Ureas

N-phenyl-N',N'-dimethyl-urea, N-phenyl-N-hydroxy-N',N'-dimethylurea, N-(4-chlorophenyl)-N',N'-dimethylurea, N-(3,4-dichlorophenyl)-N',N'-dimethylurea, N-(3,4-dichlorophenyl)-N-benzoyl-N',N'-dimethylurea, N-(4-chlorophenyl)-N'-methoxy-N'-methylurea, N-(4-chlorophenyl)-N'-isobutinyl-N'-methylurea, N-(3,4-dichlorophenyl)-N'-methoxy-N'-methylurea, N-(4-bromophenyl)-N'-methoxy-N'-methylurea, N-(4-chlorophenyl)-N'-methyl-N'-butylurea, N-(4-chlorophenyl)-N'-methyl-N'-isobutylurea, N-(2-chlorophenoxyphenyl)-N',N'-dimethylurea, N-(4-chlorophenoxyphenyl)-N',N'-dimethylurea, N-(4-chlorophenyl)-N'-methyl-N'-(1-butin-2-yl)-urea, N-benzothiazol-2-yl-N',N'-dimethylurea, N-benzothiazol-2-yl-N'-methylurea, N-(3-trifluoromethyl-4-methoxyphenyl)-N',N'-dimethylurea, N-(3-trifluoromethyl-4-isopropoxyphenyl)-N',N'-dimethylurea, N-(3-trifluoromethylphenyl)-N',N'-dimethylurea, N-(4-trifluoromethylphenyl)-N',N'-dimethylurea, N-(4-chlorophenyl)-N'-(3'-trifluoromethyl-4'-chlorophenyl)-urea, N-(3,4-dichlorophenyl)-N'-methyl-N'-butylurea, N-(3-chloro-4-trifluoromethylphenyl)-N',N'-dimethylurea, N-(3-chlor-4-ethylphenyl)-N',N'-dimethylurea, N-(3-chloro-4-methylphenyl)-N',N'-dimethylurea, N-(3-chlor-4-ethoxyphenyl)-N'-methyl-N'-methoxyurea, N-(3-chloro-4-methoxyphenyl)-N',N'-dimethylurea, N-(hexahydro-4,7-methanoindan-5-yl)-N',N'-dimethylurea, N-(2-methylcyclohexyl)-N'-phenylurea, N-(4,6-dichloro-2-pyridyl)-N'-dimethylurea, N'-cyclooctyl-N,N-dimethylurea, dichloralurea, N'-4-(4-methoxyphenoxy)phenyl-N,N-dimethylurea, N'-(3-methylphenyl)-N,N-dimethylthiourea, 1,1-dimethyl-3-[3-(N-tert.butylcarbamoyloxy)-phenyl]-urea, O,N,N-trimethyl-N'-4-chlorophenylisourea, N-3,4-dichlorophenyl-N',N'-dimethyl-α-chloroformamidine, N,N-dimethyl-N'-phenylureatrichloroacetate, and N,N-dimethyl-N'-4-chlorophenyl-ureatrichloroacetate.

B. Substituted Triazines

2-Chloro-4,6-bis(ethylamino)-s-triazine, 2-chlor-4-ethylamino-6-isopropylamino-5-triazine, 2-chloro-4,6-bis (methoxypropylamino)-s-triazine, 2-methoxy-4,6-bis(isopropylamino)-s-triazine, 2-diethylamino-4-isopropylacetamido-6-methoxy-s-triazine, 2-isopropylamino-4-methoxyethylamino-6-methyl-mercapto-s-triazine, 2-methylmercapto-4,6-bis(isopropylamino)-s-triazine, 2-methylmercapto-4,6-bis(ethylamino)-s-triazine, 2-methylmercapto-4-ethylamino-6-tert.butylamino-s-triazine, 2-methylmercapto-4-ethylamino-6-isopropylamino-s-triazine, 2-methylmercapto-4-methylamino-6-isopropylamino-s-triazine, 2-methoxy-4,6-bis(ethylamino)-s-triazine, 2-methoxy-4-ethylamino-6-isopropylamino-s-triazine, 2-chloro-4,6-bis(isopropylamino)-s-triazine, 2-azido-4-methylmercapto-6-isopropylamino-s-triazine, 2-azido-4-methylmercapto-6-sec.butylamino-s-triazine, 2-chlor-4-isopropylamino-6-(γ-methoxypropylamino)-s-triazine, 2-[6-ethylamino-b 4-chloro-s-triazin-2-yl-amino)-2-methylpropionitrile, 2-chloro-4-diethylamino-6-isopropylamino-s-triazine, 2-methoxy-4,6-bis-(3-methoxypropylamino)-s-triazine, 2-methylmercapto-4-isopropylamino-6-(3-methoxypropylamino)-s-triazine, 2-chloro-4-diethylamino-6-ethylamino-s-triazine, 2,4-bis-(3-methoxypropylamino-6-methylthio-1,3,5-triazine, 2-methylthio-4-isopropylamino-6-(γ-methoxypropylamino)1,3,5-triazine, 2-chlor-4-ethylamino-6-tert.butylamino-s-triazine and 2-(4-chlor-6-ethylamino- 1,3,5-triazin-2-yl-amino)2-methylpropionitrile.

C. Phenols

Dinitro-sec.butylphenol or salts thereof, pentachlorophenol or salts thereof, 3,5-dinitro-o-cresol, 2,6-dibromo-4-cyanophenol, 2,6-dichloro-4-cycanophenol, salts + esters, dinitro-tert.butylphenol, salts + esters, dinitro-sec.amylphenol, salts + esters, 2-ethoxymethyl-4,6-dinitrophenol, salts + esters, and 2-tert.butyl-4,6-dintro-5-methylphenol, salts + esters.

D. Carboxylic acids, salts and esters 2,4,6-trichlorophenylacetic acid, 2,3,6-trichlorobenzoic acid and salts, 2,3,5,6-tetrachlorobenzoic acid and salts, 2,3,5,6-tetrachloroterephthalic acid, 2-methoxy-3,5,6-trichlorobenzoic acid and salts, cyclopropanecarboxylic acid 2,4-dinitro-6-sec.butylphenyl ester, cyclopentanecarboxylic acid 2,4-dinitro-6-sec.butylphenyl ester, 2-methoxy-3,6-dichlorobenzoic acid and salts, 2-amino-2,5-dichlorobenzoic acid and salts, 3-nitro-2,5-dichlorobenzoic acid and salts, 2-methyl-3,6-dichlorobenzoic acid and salts, 2,4-dichlorophenoxyacetic acid, salts and esters, 2,4,5-trichlorophenoxyacetic acid, salts and esters, (2-methyl-4-chlorophenoxy) acetic acid, salts and esters, 2-(2,4,5-trichlorophenoxy) propionic acid, salts and esters, 2-(2,4,5-trichlorophenoxy) ethyl-2,2-dichloropropionic acid, salts and esters, 4-(2,4-dichlorophenoxy) butyric acid, salts and esters, 4-(2-methyl-4-chlorophenoxy) butyric acid, salts and esters, methyl-2-chloro-3-(4'-chlorophenyl)-propionate, 2-chloro-9-hydroxyfluorene-9-carboxylic acid, endo-oxo-hexahydrophthalic acid, tetrachlorophthalic acid dimethyl ester, 4-chlor-2-oxobenzothiazolin-3-yl-acetic acid, 2,2,3-trichloropropionic acid, salts + esters, 2,2-dichloropropionic acid, salts + esters, (±)2-(2,4-dichlorophenoxy)-propionic acid, salts + esters, 7oxabicyclo[ 2,2,1]heptano-2,3-dicarboxylic acid, 4-chlorophenoxyacetic acid, salts and esters, gibberellic acid, indolylacetic acid, indolylbutyric acid, (±)2-(4-chloro-2-methylphenoxy)propionic acid, salts + esters, N,N-diallylchloroacetamide, naphthylacetic acid, N-1-naphthylphthalimide acid, salts + esters, 4-amino-3,5,6-trichloro-picolinic acid, salts + esters, trichloracetic acid, 4-(2,4,5-trichlorophenoxy)butyric acid, salts + esters, 2,3,5-triiodobenzoic acid, salts + esters, benzimidoxyacetic acid, salts + esters, ethylene glycol-bis-trichloroacetate, chloracetic acid diethylamide, 2,6-dichlorothiobenzamide, 2,6-dichlorobenzonitrile, N,N-dimethyl-α,α-diphenylacetamide, diphenylacetonitrile and N-hydroxymethyl-2,6-dichlorothiobenzamide.

E. Carbamic acid derivatives

Carbanilic acid isopropyl ester, 3,4-dichloro-carbanilic acid methyl ester, m-chloro-carbanilic acid isopropyl ester, m-chlorocarbanilic acid 4-chloro-2-butinyl ester, m-tri-fluoromethyl-carbanilic acid isopropyl ester, 2,6-di-tert.butyl-4-tolyl-N-methylcarbamate, 3-(methoxycarbonylamino) phenyl-N-3-tolycarbamate, 4-chloro-2-butinyl-N-(3-chlorophenyl)-carbamate, methyl 2-isopropyl-4-(methylcarbamoyloxy)carbanilate, and also diallate, N,N-dipropyl-S-ethylthiocarbamate, molinates and dithiocarbamates of general formula

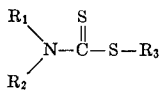

wherein $R_1$, $R_2$ and $R_3$ each represents a lower alkyl or alkenyl radical, or wherein $R_1$ and $R_2$ together with the nitrogen atom bonded to them represent a 5, 6- or 7-membered, optionally alkylated, ring with a total of six or seven carbon atoms, with the exo-alkyl groups having to be bonded to the carbon atoms adjacent to the nitrogen atom, and $R_3$ represents the ethyl, propyl, n-butyl or isobutyl radical, and amongst these especially N-butyl-N-ethyl-S-propyl-dithiocarbamate, N,N-diisobutyl-S-propyl-dithiocarbamate, N,N,S-tripropyl-dithiocarbamate, N-isobutyl-N-allyl-S-propyldithiocarbamate, N-isobutyl-N-methyllyl-S-ethyldithiocarbamate, N-isobutyl-N-methallyl-S-propyldithiocarbamate, N,N-dimethallyl-S-propyldithiocarbamate, N-butyl-N-ethyl-S-propyl-thiocarbamate and N,N,S-tripropylthiocarbamate, as well as N-(4-aminobenzosulphonyl) methylcarbamate, 1-methyl-prop-2-yl-N-(3-chlorophenyl)carbamate, isopropyl-N-(3-chlorophenyl)-carbamate, S-2,3-dichlorallyl-N,N-diisopropylthiocarbamate, S-ethyl-N,N-dipropylthiocarbamate, N-methyldithiocarbamic acid, S-propyl-N-butyl-N-ethylthiolcarbamate, 3-(m-tolyl-carbamoyloxy)-phenylcarbamate, isopropyl-N-phenyl-carbamate, 2-chlorallyl-N,N-diethyldithiocarbamate, methyl-N-(3,4-dichlorophenyl) carbamate, S-2,3,3-trichlorallyl-N,N-diisopropylthiolcarbamate, S-propyl-N,N-dipropylthiolcarbamate, S-ethyl-N-ethylthio-cyclohexanecarbamate, 3,4-dichlorobenzylmethylcarbamate, S-ethyl-N-hexahydro-1H-azepinethiolcarbamate, 2,6-di-t-butyl-4-methylphenyl-N-methyl-carbamate, methyl-N-(4-nitrobenzosulphonyl) carbamate, N,N-hexamethyl-S-isopropyl(thiocarbamate), S-ethyl-N,N-diisobutylthiolcarbamate, 2-chlorobutinyl-N-(3-chlorophenyl)carbamate, D-N-ethyl-2-(phenylcarbamoyloxy)-propionamide, S-ethyl-N,N-diisobutylthiolcarbamate and methyl-N'-(N'-methoxycarbamoyl-sulphanilyl)-carbamate.

F. Anilides 3,4-Dichloropropionanilide,3-chloro-4-bromopropionanilide,3-bromo-4-chloropropionanilide, cyclopropanecarboxylic acid 3,4-dichloranilide, cyclopropanecarboxylic acid 3-chloro-4-bromanilide, cyclopropanecarboxylic acid 3-bromo-4-chloranilide, N-(3,4-dichlorophenyl)-2-methylpentamide, N-1-naphthyl-phthalamic acid, N-(3-tolyl)-phthalamic acid, 2-methacryl-3',4'-dichlor-anilide, N-(4-chlorophenyl)-2,2-dimethylvaleramide, N-(3-chloro-4-methylphenyl)-2-methylpentanamide, α-chlor-N-isopropylacetanilide, 2-(α-naphthoxy)-N,-diethylpropionamide, 2-chloro-N-(2-methyl-6-t-butylphenyl)acetamide, 2-chloro-N-2,6-diethylphenyl-N-methoxymethylacetamide, 6-methyl-N-methoxymethyl-2-t-butyl-α-bromacetanilide, 2-[(4-chlor-o-tolyl)oxy]-N-methoxyacetamide, and 2-chlor-N-isopropyl-acetanilide.

G. Organic phosphorus compounds tris-2,4-Dichlorophenoxyethyl)phosphite, 0-(2,4-dichlorophenyl)0'-methyl-N-isopropyl-amidothiophosphate, N[2(0,0-diisopropyl-dithiophosphoryl)ethyl]benzenesulphonamide, and S,S,S-tributyl-thiophosphate.

H. Various compounds 4,5-Dichloro-2-trifluoromethylbenzimidazole, 2-chloroethyltrimethyl-ammonium chloride, maleic acid hydrazide, methylarsonic acid di-Na salt, 4,5,7-trichlorobenzthiodiazole-2,1,3,3-amino-1,2,4-triazole, trichlorobenzyl chloride, 2-phenyl-3,1-benzoxazinone, N-butyl-N-ethyl-2,6-dinitro-4-trifluoromethylaniline, N,N-di-(n-propyl)-2,6-dinitro-4-trifluoromethylaniline, 4-trifluoromethyl-2,4'-dinitro-diphenyl-ether, 2,4,6-trichloro-4'-nitrodiphenyl-ether, 4-trifluoromethyl-2,4'-dinitro-3'-methyl-diphenyl-ether, 2,4-dichloro-4'-nitro-diphenyl-ether, 5-chloro-6-methyl-3-tert.butyluracil, ammonium sulphamate, 5-bromo-6-methyl-3-(1-methyl-N-propyl-uracil, 1,2,4,5,6,7,10,10-octachloro-4,7,8,9-tetrahydro-4,7-methyleneindane, M-isopropyl-xanthate, 5-brom-3-isopropyl-6-methyluracil, 3-cyclohexyl-6-methyluracil, 3-cyclohexyl-6sec. butyluracil, 3-cyclohexyl-5-bromuracil, 3-cyclohexyl-5-chloruracil, 3-cyclohexyl-5,6-trimethylene-uracil, 3-isopropyl-5-chloruracil, 3-isopropyl-5-bromuracil, 2-chlor-N-ethyl-4-thio-cyanatoaniline, 2,3,6-trichlorobenzyloxypropanol, hex-achloro-2-propanone, sodium 2-(2,4,5-trichlorophenoxy)-ethylsulphate, potassium cyanate, 3,5-dibromo-4-hydroxybenzaldoxime-2',4'-dinitrophenyl-ether, 3,5-diiodo-4-hydroxybenzaldoxime-2',4'-dinitrophenyl-ether, acrolein, arsenates, alkyl alcohol, 2,4-dinitrophenyl, 2,4-dinitro-6-sec.butylphenylcarbonate, 5-chlor-2-isopropylbenzimidazole, 5-iodo-2-trifluoromethylbenzimidazole, 3-cyclohexyl-6,7-dihydro-1H-cyclophentapyrimidine-2,4-(3H,5H)dione, 1:1-ethylene-2:2-dipyridylium bromide, 1,1-dimethyl-3,4'-bipyridylium-dimethylsulphate, di(methoxythiocarbonyl)disulphide, 2-methyl-4-(3'-trifluoromethylphenyl)-tetrahydro-1,2,4-oxadiazine-3,5-diones, 1-phenyl-4,5-dimethoxy-6-pyridazone, 6-chloro-2-difluoromethyl-3H-imidazo[4,5b]-pyridine, 2-tert.butyl-6-chlorimidazo[4,5b]-pyridine, 5-amino-4-bromo-2-phenylpyridazin-3-one, hexafluoracetone hydrate, 3,5-dinitro-4-dipropylamino-benzenesulphonamide, cacodyl, 4-(methylsulphonyl)-2,6-dinitro-N,N-dipropylaniline, 4-methyl-2,6-dinitro-N,N-dipropylaniline, 5-amino-4-chloro-2-phenyl-3-pyridazone, 2,3,5-trichloro-4-pyridinol, 3,4,5,6-tetrahydro-3,5-dimethyl-1,3,5-thiadiazine-2-thione, sodium 2-(2,4-dichlorophenoxy)ethylsulphate, 2,3-dichloro-1,4-naphthoquinone, di(ethoxythiocarbonyl)disulphide, and 3,5-dichloro-2,6-difluoro-4-hydroxy-pyridine.

Such preparations can be employed in the form of solutions, emulsions, suspensions, granules or dusting agents. The form used depends on the use to which the agent is to be put and a fine divisibility of the active ingredient must be ensured.

The content of active ingredient in the preparations described above lies within the range of from 0.1 to 95 percent and at the same time it should be mentioned that in application from aircraft or by means of other suitable application instruments, concentrations of up to 99.5 percent or even pure active ingredient may be employed.

In order to manufacture solutions, it is possible to use solvents, for example, especially alcohols, for example, ethyl or isopropyl alcohol, ketones, for example, acetone or cyclohexanone, aliphatic hydrocarbons, for example, kerosene, and cyclic hydrocarbons, for example, benzene, toluene, xylene, tetrahydronaphthalene and alkylated naphthalenes, and also chlorinated hydrocarbons, for example, tetrachlorethane and ethylene chloride, and finally also mineral and vegetable oils or mixtures of the above-mentioned substances.

The aqueous preparations are preferably emulsions and dispersions. The active substances, as such or in one of the above-mentioned solvents, are homogenized in water, preferably with wetting agents or dispersing agents. As an example of cationic emulsifiers or dispersing agents, quaternary ammonium compounds may be mentioned; amongst anionic agents, soaps, aliphatic long-chain sulphuric acid monoesters, aliphatic-aromatic sulphonic acids and long-chain alkoxy acetic acids may for example be mentioned; amongst non-ionic agents, polyglycol ethers of fatty alcohols or ethylene oxide condensation products of p-tert.alkylphenols. It is also possible to manufacture concentrates consisting of active ingredient, emulsifier or dispersing agent and, where appropriate, solvents. Such concentrates can be diluted before use, for example with water.

Dusting agents can be manufactured by mixing or conjoint grinding of an active ingredient with a solid carrier. Possible carriers are for example: talc, diatomaceous earth, kaolin, bentonite, calcium carbonate, boric acid and tricalcium phosphate, but also wood flour, cork powder, charcoal and other materials of vegetable origin. Dusting agents can also be manufactured absorbing the active ingredient on the carrier by means of a volatile solvent. Pulverulent preparations and pastes can be rendered capable of suspension in water, and usable as spraying agents, by adding wetting agents and protective colloids.

Granules can be manufactured in a simple manner, by dissolving the active ingredient in an organic solvent and absorbing it on the carrier, and subsequently evaporating the solvent. Possible carriers are finely granular substances such as pumice, attapulgite, and also polyacrylonitrile, melamine-formaldehyde condensates and urea-formaldehyde condensates.

Granules can also be manufactured by mixing the active ingredient of formula (I) with a polymerizable compound, after which a polymerization is carried out by which the active ingredient remains unaffected, with the granulation being carried out while the polymerization is still proceeding.

The following Examples illustrate the invention:

EXAMPLE 1

N-(2n-Butoxypyridyl-5)-N',N'-dimethylurea 36.7 ml of dimethylcarbamoyl chloride were added dropwise at room temperature, and under a nitrogen atmosphere, to a vigorously stirred mixture of 66.5 g of 5-amino-2-butoxypyridine, 84 g of sodium bicarbonate and 1 g of sodium iodide in 150 ml of absolute benzene. After stirring for 2 hours, the precipitate was filtered off, eluted, dried and recrystallized from benzene. Yield: 52 percent. Melting point: 112°–113°C.

Active substance 1.1

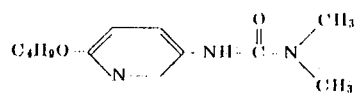

The following ureas were manufactured analogously.

| Active ingredient No. | Structure | Melting point, °C |
|---|---|---|
| 1.2 | CH₃O—pyridyl—NH—C(O)—N(CH₃)₂ | 235–236 |
| 1.3 | C₄H₉—O—pyridyl—NH—C(O)—N(CH₃)(H) | 126–127 |
| 1.4 | CH₃O—pyridyl—NH—C(O)—N(CH₃)(H) | 143–144 |
| 1.5 | C₄H₉O—pyridyl—NH—C(O)—N(OCH₃)(CH₃) | 52.5–53 |
| 1.6 | CH₃O—pyridyl—NH—C(O)—N(OCH₃)(CH₃) | 84–85 |
| 1.7 | C₄H₉O—pyridyl—NH—C(O)—N(C₄H₉)(H) | 93–94 |
| 1.8 | CH₃O—pyridyl—NH—C(O)—N(C₄H₉)(H) | 96–97 |
| 1.9 | C₄H₉O—pyridyl—NH—C(O)—N(CH(CH₃)₂)(H) | 138–139 |
| 1.10 | CH₃O—pyridyl—NH—C(O)—N(CH(CH₃)₂)(H) | 172–173 |

EXAMPLE 2

Dusting agents

Equal parts of an active ingredient according to the invention and of precipitated silica are finely ground.

Dusting agents preferably containing 1 to 6 percent of active ingredient can be manufactured therefrom by mixing with kaolin or talc.

Wettable powder

To manufacture a wettable powder, the following components are, for example, mixed and finely ground:
- 50 parts of active ingredient according to the present invention
- 20 parts of high adsorbent silica
- 25 parts of Bolus alba (kaolin)
- 1.5 parts of sodium 1-benzyl-2-stearyl-benzimidazole-6,3'-disulphonate, and
- 3.5 parts of a reaction product of p-tert. octylphenol and ethylene oxide.

Emulsion concentrate

Easily soluble active ingredients can also be formulated as an emulsion concentrate in accordance with the following instruction:
- 20 parts of active ingredient
- 70 parts of xylene and
- 10 parts of a mixture of a reaction product of an alkylphenol with ethylene oxide and calcium dodecylbenzenesulphonate are mixed. On dilution with water to the desired concentration, a sprayable emulsion is produced.

Granules 7.5 g of one of the active ingredients of formula (I) are dissolved in 100 ml of acetone and the acetone solution thus obtained is added to 92 g of granular attapulgite (mesh size: 24/48 meshes/inch). The whole is well mixed and the solvent is stripped in a rotary evaporator. A granular material of 7.5 percent active ingredient content is obtained.

EXAMPLE 3

To test the action against Echinochloa and Sesbania in rice, active ingredient No. 1.1 was employed in the form of granules and as a wettable powder.

The post-emergence treatment was carried out both in paddy rice and also in upland rice in the 1½ to 3 leaf stage of the weeds Echinochloa and Sesbania, using an amount of 1 to 8 kg of active ingredient per hectare. The pre-emergence treatment was carried out 24 hours after sowing the weed Echinochloa in paddy rice, using 1 to 2 kg of active ingredient per hectare.

Rating: 1 plant unaffected
9 plant totally destroyed

Post-emergence treatments
a)

| Amount used active ingredient No. 1.1 kg/hectare | Upland rice | Echino-chloa | Sesbania |
| --- | --- | --- | --- |
| 2 | 1 | 6 | 9 |
| 4 | 1 | 9 | 9 |
| 6 | 3 | 9 | 9 |
| 8 | 4 | 9 | 9 | b)

| Amount used active ingredient No. 1.1 kg/hectare | Paddy rice | Echinochloa |
| --- | --- | --- |
| 2 | .1 | 7 |
| 3 | 1 | 8 |
| 4 | 1 | 9 |

Pre-emergence treatment
c)

| Amount used active ingredient No. 1.1 kg/hectare | Paddy rice | Echinochloa |
| --- | --- | --- |
| 1 | 1 | 9 |
| 2 | 1 | 9 |

What is claimed is:

1. A compound of the formula

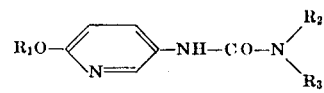

wherein $R_1$ is $C_1$–$C_4$ alkyl; $R_2$ is $C_1$–$C_4$ alkoxy and $R_3$ is $C_1$–$C_4$ alkyl.

2. A compound according to claim 1 of the formula

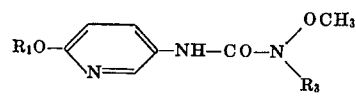

wherein $R_1$ is $C_1$–$C_4$ alkyl and $R_3$ is $C_1$–$C_4$ alkyl.

3. The compound according to claim 1 of the formula

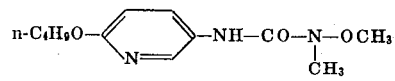

4. The compound according to claim 1 of the formula

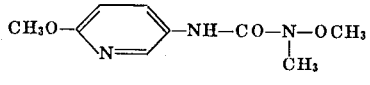

* * * * *